UNITED STATES PATENT OFFICE.

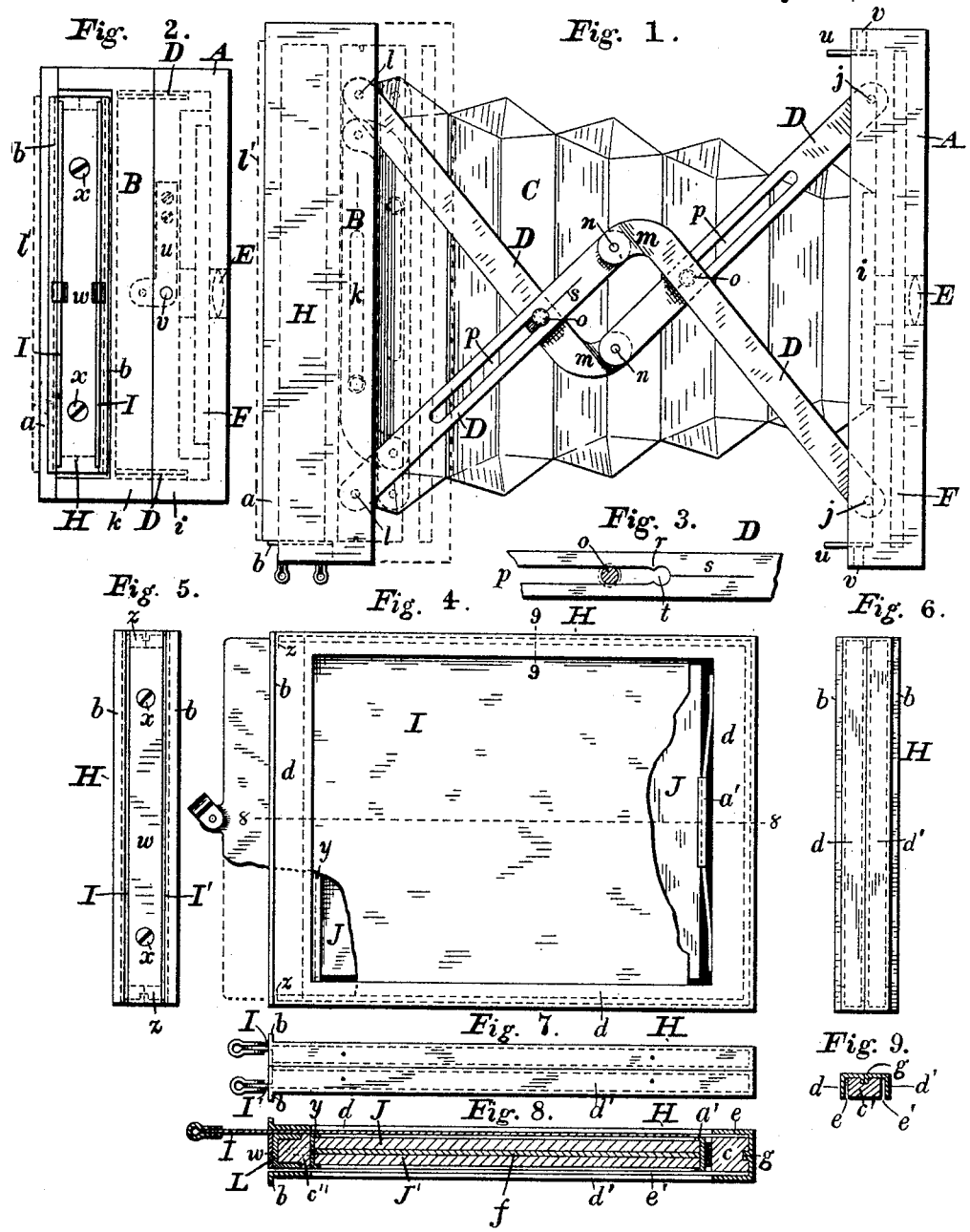

SILAS FRENCH, OF ROCHESTER, NEW YORK, ASSIGNOR OF ONE-HALF TO ALBERT BEIR, OF SAME PLACE.

PHOTOGRAPHIC CAMERA.

SPECIFICATION forming part of Letters Patent No. 582,995, dated May 18, 1897.

Application filed January 25, 1897. Serial No. 620,580. (Model.)

*To all whom it may concern:*

Be it known that I, SILAS FRENCH, a citizen of the United States, residing at Rochester, in the county of Monroe, in the State of New York, have invented certain Improvements in Photographic Cameras, of which the following is a specification.

My invention relates to certain improvements in the construction of photographic cameras, whereby they are made more compact and portable than heretofore, which improvements are fully described and illustrated in the following specification and the accompanying drawings, the novel features thereof being specified in the claims annexed.

In the accompanying drawings, representing my improvements, Figure 1 is a plan or top view of my improved camera expanded into position for making exposures. Fig. 2 is a side view of the same collapsed. Fig. 3 is a detail showing the locking device on the expanding-bars. Fig. 4 is a side view of my improved plate-holder removed. Fig. 5 is an end view of the same as seen from the left hand in Fig. 4. Fig. 6 represents the opposite end of the plate-holder. Fig. 7 is an edge view. Fig. 8 is a longitudinal section on the line 8 8, Fig. 4. Fig. 9 is a section on the line 9 9, Fig. 4.

My improved camera consists, essentially, of the front A, carrying the lens and shutter; the back B, containing the plate-holder; the bellows C, and the expanding bars or links D D. The front is of any suitable construction, arranged to hold the lens E and a suitable shutter, which may be located in a recess at F. The front is conveniently made of two wooden plates, having the shutter between them and having the forward end of the bellows attached to the rear plate and with a projecting ledge $i$ all around, to which the ends of the links are pivoted. The back is similarly provided with a projecting ledge $k$, to which the rear ends of the links are pivoted, and it contains a recess for the plate-holder H, which is very thin, of sheet metal, so that when the camera is closed up, as indicated in Fig. 2, the result of the construction is the production of a camera which for any given size of plates is smaller and more compact than any with which I am acquainted. In order to secure this result, the links D are made to fold entirely within the flanges on the front and back when the camera is collapsed, and the plate-holder contributes to the effect by being made of the least possible dimensions, of sheet metal. The forward ends of the links are pivoted inside the flanges $i$ on the pins $j$ and their rear ends on the pins $l$ on the flanges $k$. The links cross each other as shown, the bent ends $m$ of one being pivoted to the ends of the other at $n$. The positions of the links when the front is collapsed on the back is indicated by the dotted lines in Figs. 1 and 2. It will be observed that the links are pivoted to the front and back, respectively, on studs permanently inserted in such parts near their outer edges and that such construction and the crossing of the links afford great rigidity and avoids sliding joints between the links and the front and back. One of the links D of each pair is provided with a slot $p$, in which a pin or stud $o$, inserted in the other link, plays backward and forward when the camera is opened or closed. The studs $o$, traveling in the slots $p$, serve as guides and maintain the proper relative positions of the front and back.

A suitable locking device may be provided, such as a spring-catch, or, more simply, that form of spring-catch shown in Fig. 3, in which the slot $p$ is slightly narrowed, as indicated at $r$, near its end, the link being sawed or split, as shown at $s$, beyond this point, so that a recess $t$ is formed in which the stud $o$ engages and is held with sufficient force to maintain the camera distended for ordinary purposes, while it may be readily collasped when desired, the stud spreading the sides of the link, so as to enable it to escape from the recess $t$. It will be understood that the inner surfaces of the flanges $i$ and $k$ are recessed to permit the folding up of the links and that the system of links is duplicated on the opposite side of the camera from that shown in Fig. 1.

To hold the camera closed, the spring-catch $u$ is employed, preferably on both sides, arranged inside the flanges and attached to one while engaging with a pin on the other and provided with a push or knob $v$, which extends to the outside. The back is provided with an internal flange, to which the rear end of the bellows is attached and which is provided with an opening of proper size for the exposure of the plate.

It will of course be understood that when the camera is opened out the length of the links and the position of the locking device is so proportioned to the focal length of the lens that the sensitive surface of the plate will be properly in focus. At one end or side the back frame B is provided with a recess to receive the plate-holder H, which is provided with the projecting ledges $b\ b$, which assist in securing a light-tight joint by fitting close up against the edges of the recess when the plate-holder is inserted, the rear wall $a$ being cut away, if desired, for this purpose, as shown most clearly in Fig. 1. The plate-holder is made by inclosing a wooden frame $c\ c'\ c''$ within two sheet-metal shells $d\ d'$, which are so formed and bent as to fit over the frame, spaces $e\ e'$, Fig. 9, being left between the inwardly-projecting flanges of the shells and the sides of the frame to permit the insertion of the exposing-slides I I', which may be made of sheet metal or any suitable material.

In Fig. 8 two plates J J' are indicated in place in the holder, separated by a septum $f$, which may be either removable with the plates or fastened to the interior of the frame. The shells are attached to the interior wooden frame in any suitable way, such as by pins or screws, or a groove is formed centrally lengthwise on three sides of the frame and the shells are provided with the inwardly-turned flanges $g$, Figs. 8 and 9, which engage in the groove. The shells can be slid lengthwise onto the frame, the flanges entering the grooves, and they are then secured in place by pins or by bending the ends of the sides of the shells over on the ends of the frame-bar $c''$, as indicated at $z$, Figs. 4 and 5, the plate $w$ being then fastened over the ears $z\ z$ by the screws $x$. The bars constituting the interior frame are halved or jointed onto each other and secured together in any suitable manner. In the case where the shells $d\ d'$ are not provided with the internally-projecting ribs $g$ the shells are held on the frame by pins or screws, which may also be used with the ribs, but are unnecessary when the ears $z\ z$ are employed, the latter giving a superior finish and appearance.

Inside the frame-bar $c''$ is placed a plate, secured by screws or otherwise, provided with the projecting ledges $y$, Figs. 4 and 8, which engage over the edges of the plates and hold them in place, a spring $a'$ being applied to the opposite frame-bar $c$ and provided with ledges reaching over the edges of the plates, so that the latter can be removed or replaced by compressing the spring. In order to make the openings through which the exposing-slides pass light-tight, I form a recess on three sides of the frame-bar $c''$, and fit into it a strip L, Fig. 8, of felt or other suitable material, which springs outward and closes the openings when the slides are removed. This strip is secured in place by the plate $w$. By my improved construction I am enabled to make a plate-holder which for two plates does not exceed one-quarter of an inch in thickness, being considerably thinner than any wooden plate-holder now on the market.

The camera with my improvement is very compact, and it is exceedingly convenient, because if it be carried collapsed, (as it readily may be in the pocket,) with the forward exposing-slide I' removed, (and this may be stored in a receptacle $l'$ on the plate $a$ of the back,) the operator has only to draw out the front and snap his shutter on the desired object, thus securing a negative with the least possible preparation in a collapsible camera.

I claim—

1. The combination in a collapsible camera of the front, back and bellows, a pair of crossed links pivoted to the front near its outer edges, a pair of crossed links pivoted to the back near its outer edges, each link extending inward beyond the point of crossing and pivoted to one of the opposite pair, and a spring-catch consisting of a slot $p$ contracted at one end in one link and a pin $o$ in its crossed link, substantially as described.

2. The combination in a plate-holder, of the frame having grooves on its opposite sides and sheet-metal shells having internal flanges $g$ fitting said grooves to hold said shells upon the frame, the frame members in transverse section being of less dimensions than the shells to provide slide-receiving spaces $e, e'$, and slides I, I', substantially as described.

3. The combination with the interior wooden frame, of the flanged apertured sheet-metal shells $d\ d'$, applied to and inclosing the frame from opposite sides, the exposing-slides I I' arranged to slide in recesses between the shells and the frame, the septum in the frame, means for holding the plates in the frame, and means for excluding the light when the slides are removed, substantially as described.

4. The combination with the interior wooden frame, of the flanged apertured sheet-metal shells $d\ d'$, applied to and inclosing the frame from opposite sides, the exposing-slides I I' arranged to slide in recesses between the shells and the frame, the septum and means for holding the plates in the frame, the removable plate attached to the frame at the end between the slides, and the light-excluding device L, substantially as described.

5. The combination with the interior wooden frame, of the flanged apertured sheet-metal shells $d\ d'$, applied to and inclosing the frame from opposite sides and having the ears $z\ z$ bent over the end of the frame, the exposing-slides I I' arranged to slide in recesses between the shells and the frame, the septum and means for holding the plates in the frame, the removable plate $w$ attached to the frame at the end between the slides over the ears, and the light-excluding device L, substantially as described.

SILAS FRENCH.

Witnesses:
C. G. CRANNELL,
G. S. DEY.